(12) United States Patent
Griffiths et al.

(10) Patent No.: US 8,905,354 B2
(45) Date of Patent: Dec. 9, 2014

(54) EXTERNAL MAINTENANCE STEP AND HAND HOLD

(71) Applicant: Bell Helicopter Textron Inc., Fort Worth, TX (US)

(72) Inventors: Paul C. Griffiths, St-Sauveur (CA); John Scott Harding, Kirkland (CA)

(73) Assignee: Bell Helicopter Textron Inc., Fort Worth, TX (US)

( * ) Notice: Subject to any disclaimer, the term of this patent is extended or adjusted under 35 U.S.C. 154(b) by 149 days.

(21) Appl. No.: 13/755,110

(22) Filed: Jan. 31, 2013

(65) Prior Publication Data

US 2014/0209748 A1  Jul. 31, 2014

(51) Int. Cl.
*B64C 1/24* (2006.01)
*B64C 1/00* (2006.01)

(52) U.S. Cl.
CPC ........................................ *B64C 1/00* (2013.01)
USPC ......... 244/129.6; 244/129.1; 182/89; 182/91; 280/166; 280/163

(58) Field of Classification Search
USPC ......... 244/129.6, 129.1, 117 R, 137.1, 137.2; 182/91, 90, 127; 280/166, 727.163
See application file for complete search history.

(56) References Cited

U.S. PATENT DOCUMENTS

| | | | | |
|---|---|---|---|---|
| 2,158,949 A | * | 5/1939 | Sarles et al. ...................... 182/91 |
| 2,294,000 A | * | 8/1942 | Reisner et al. ............. 244/117 R |
| 2,494,367 A | * | 1/1950 | Steele et al. ............... 244/129.6 |
| 2,910,255 A | * | 10/1959 | Johnson ...................... 244/129.6 |
| 2,951,454 A | * | 9/1960 | Candlin, Jr. .................... 105/447 |
| 3,904,155 A | * | 9/1975 | Chavis ........................ 244/118.1 |
| 3,986,503 A | * | 10/1976 | Le Guillon ...................... 182/89 |
| 4,116,457 A | * | 9/1978 | Nerem et al. ................. 280/166 |
| 4,205,862 A | * | 6/1980 | Tarvin ............................ 280/166 |
| D272,618 S | * | 2/1984 | McNab et al. ............... D12/345 |
| 4,440,364 A | * | 4/1984 | Cone et al. ................. 244/129.6 |
| 4,462,486 A | * | 7/1984 | Dignan ............................ 182/91 |
| D287,714 S | * | 1/1987 | Short ........................... D12/345 |
| 4,639,032 A | * | 1/1987 | Barbour .......................... 296/62 |
| 4,750,753 A | * | 6/1988 | Dezern ...................... 280/164.1 |
| 4,836,568 A | * | 6/1989 | Preslik et al. .............. 280/164.1 |
| 5,358,067 A | * | 10/1994 | Ford et al. ....................... 182/91 |
| 6,170,842 B1 | * | 1/2001 | Mueller ......................... 280/163 |
| D445,076 S | * | 7/2001 | Weinerman .................. D12/203 |
| D449,264 S | * | 10/2001 | Weinerman .................. D12/203 |
| 6,471,002 B1 | * | 10/2002 | Weinerman ..................... 182/91 |
| 6,834,875 B2 | * | 12/2004 | Leitner et al. ................. 280/166 |
| 6,840,526 B2 | * | 1/2005 | Anderson et al. ............. 280/166 |
| D505,900 S | * | 6/2005 | Oravec, III ................... D12/203 |

(Continued)

FOREIGN PATENT DOCUMENTS

EP        2386484 A1    11/2011

*Primary Examiner* — Christopher P Ellis
*Assistant Examiner* — Medhat Badawi
(74) *Attorney, Agent, or Firm* — Noah A. Tevis

(57) ABSTRACT

A step assembly for a vehicle can include a housing and a support member hingedly coupled to the housing with a shaft. A first locking feature can be associated with the housing while a second locking feature can be associated with the support member. A spring can be operably associated with the support member and the housing such that the spring can bias the second locking feature toward the first locking feature. The support member is configured to rotate between a stowed position and a deployed position. Further, the support member is configured as a step support and a hand hold device.

18 Claims, 11 Drawing Sheets

(56) References Cited

U.S. PATENT DOCUMENTS

| | | | |
|---|---|---|---|
| D506,171 S * | 6/2005 | Oravec, III | D12/203 |
| 7,566,064 B2 * | 7/2009 | Leitner et al. | 280/166 |
| 7,716,757 B2 * | 5/2010 | Sumpton et al. | 4/621 |
| 7,766,357 B2 * | 8/2010 | Arvanites | 280/166 |
| 7,857,337 B2 * | 12/2010 | Ferguson et al. | 280/166 |
| 7,976,042 B2 * | 7/2011 | Watson et al. | 280/166 |
| 8,037,557 B2 * | 10/2011 | Sumpton et al. | 4/621 |
| 8,056,913 B2 * | 11/2011 | Kuntze et al. | 280/166 |
| 8,157,277 B2 * | 4/2012 | Leitner et al. | 280/166 |
| 8,196,865 B2 * | 6/2012 | Martin | 244/129.6 |
| 8,360,455 B2 * | 1/2013 | Leitner et al. | 280/166 |
| 8,419,034 B2 * | 4/2013 | Leitner et al. | 280/166 |
| 8,469,312 B2 * | 6/2013 | Gorlich et al. | 244/129.6 |
| 8,668,217 B2 * | 3/2014 | Ziaylek et al. | 280/166 |
| 2003/0038446 A1 * | 2/2003 | Anderson et al. | 280/166 |
| 2003/0070875 A1 * | 4/2003 | Medsker | 182/91 |
| 2003/0132595 A1 * | 7/2003 | Fabiano et al. | 280/166 |
| 2003/0184040 A1 * | 10/2003 | Leitner et al. | 280/166 |
| 2004/0084868 A1 * | 5/2004 | Leitner et al. | 280/166 |
| 2005/0173191 A1 * | 8/2005 | Linzmayer | 182/127 |
| 2007/0017743 A1 * | 1/2007 | Yeh | 182/127 |
| 2008/0042396 A1 * | 2/2008 | Watson et al. | 280/166 |
| 2009/0008894 A1 * | 1/2009 | Kuntze et al. | 280/166 |
| 2009/0078827 A1 * | 3/2009 | Martin | 244/129.6 |
| 2009/0308688 A1 * | 12/2009 | Tayar | 182/89 |
| 2011/0272524 A1 * | 11/2011 | Gorlich et al. | 244/129.6 |
| 2012/0025485 A1 * | 2/2012 | Yang et al. | 280/166 |
| 2014/0110193 A1 * | 4/2014 | Conley et al. | 182/91 |

* cited by examiner

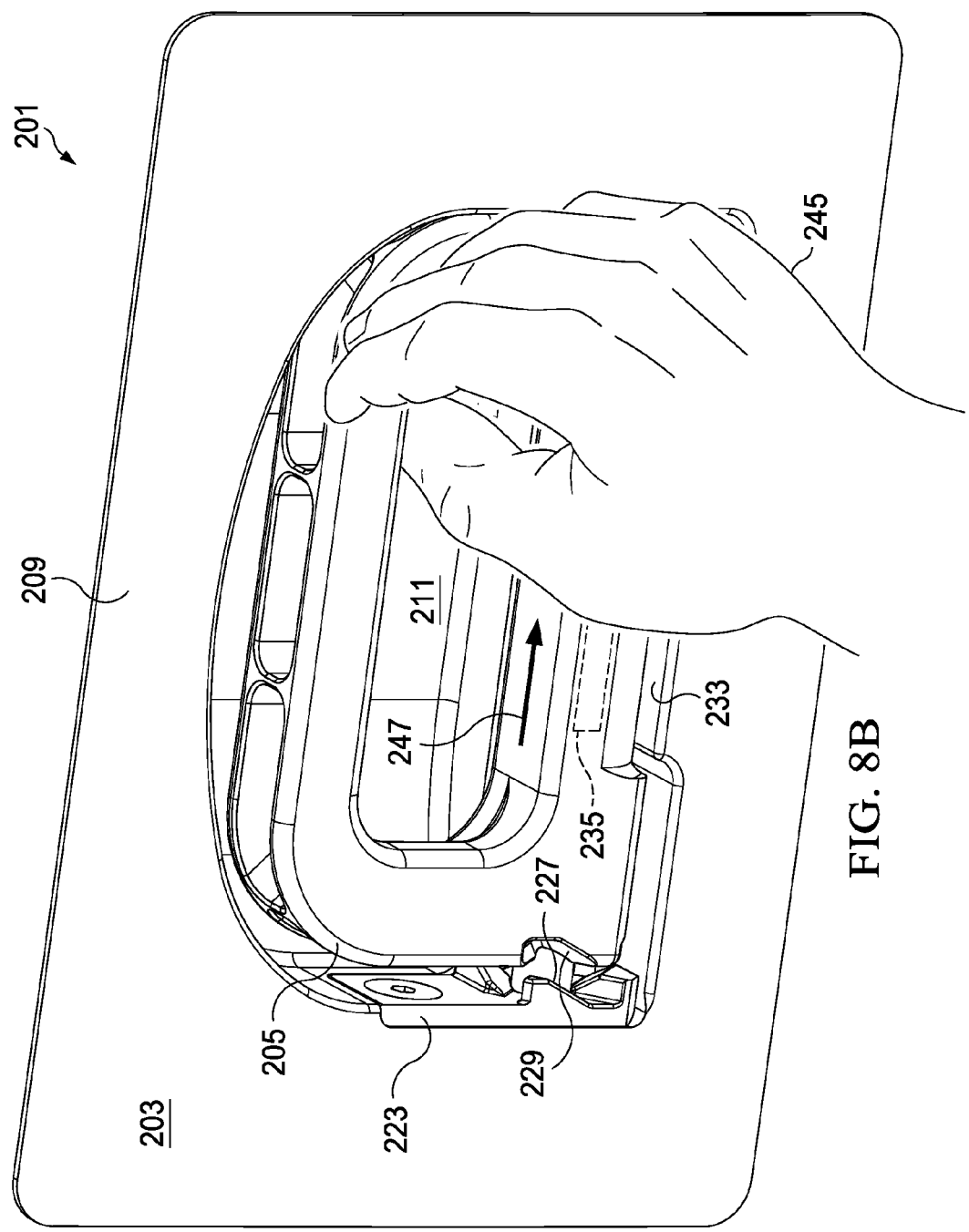

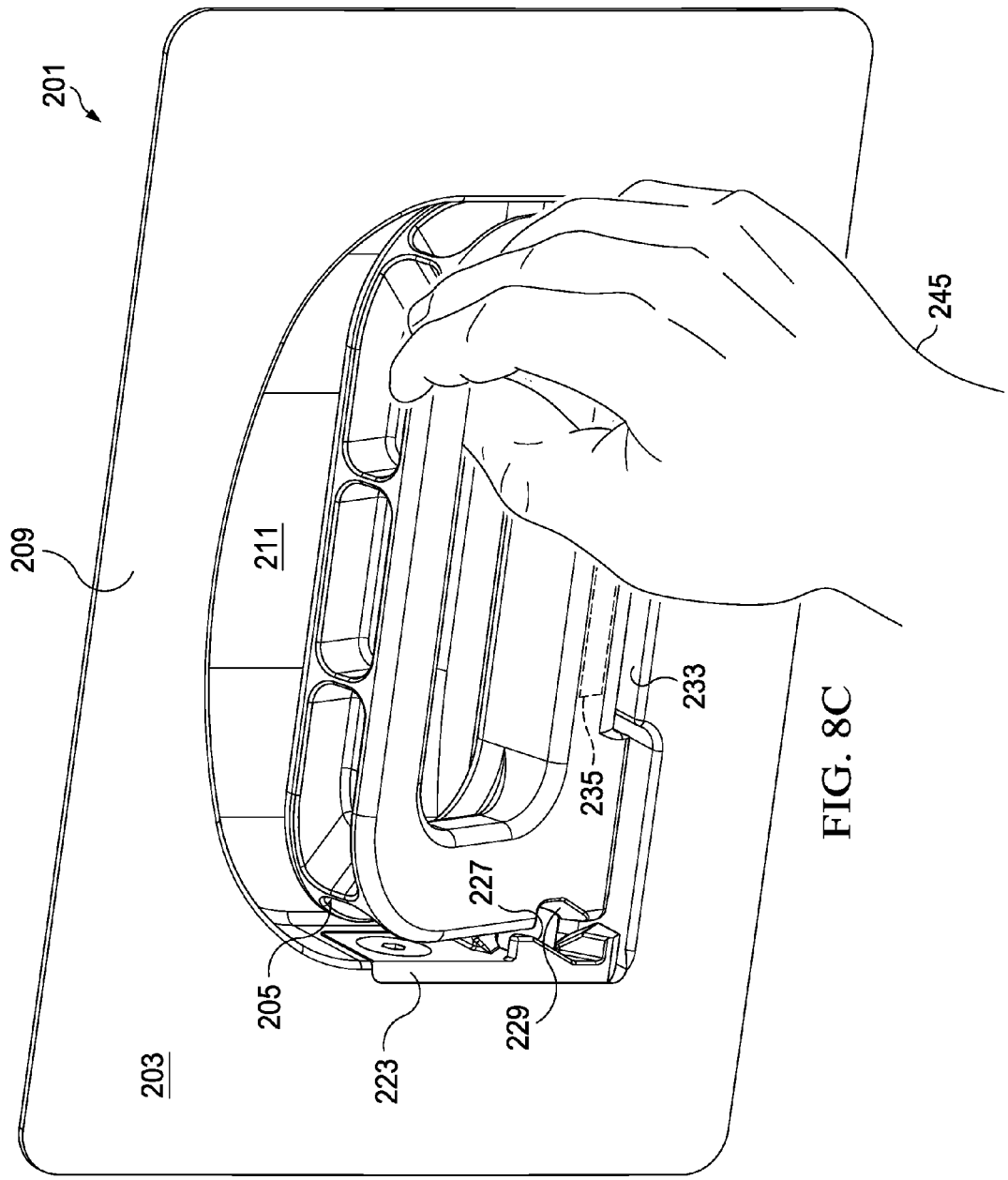

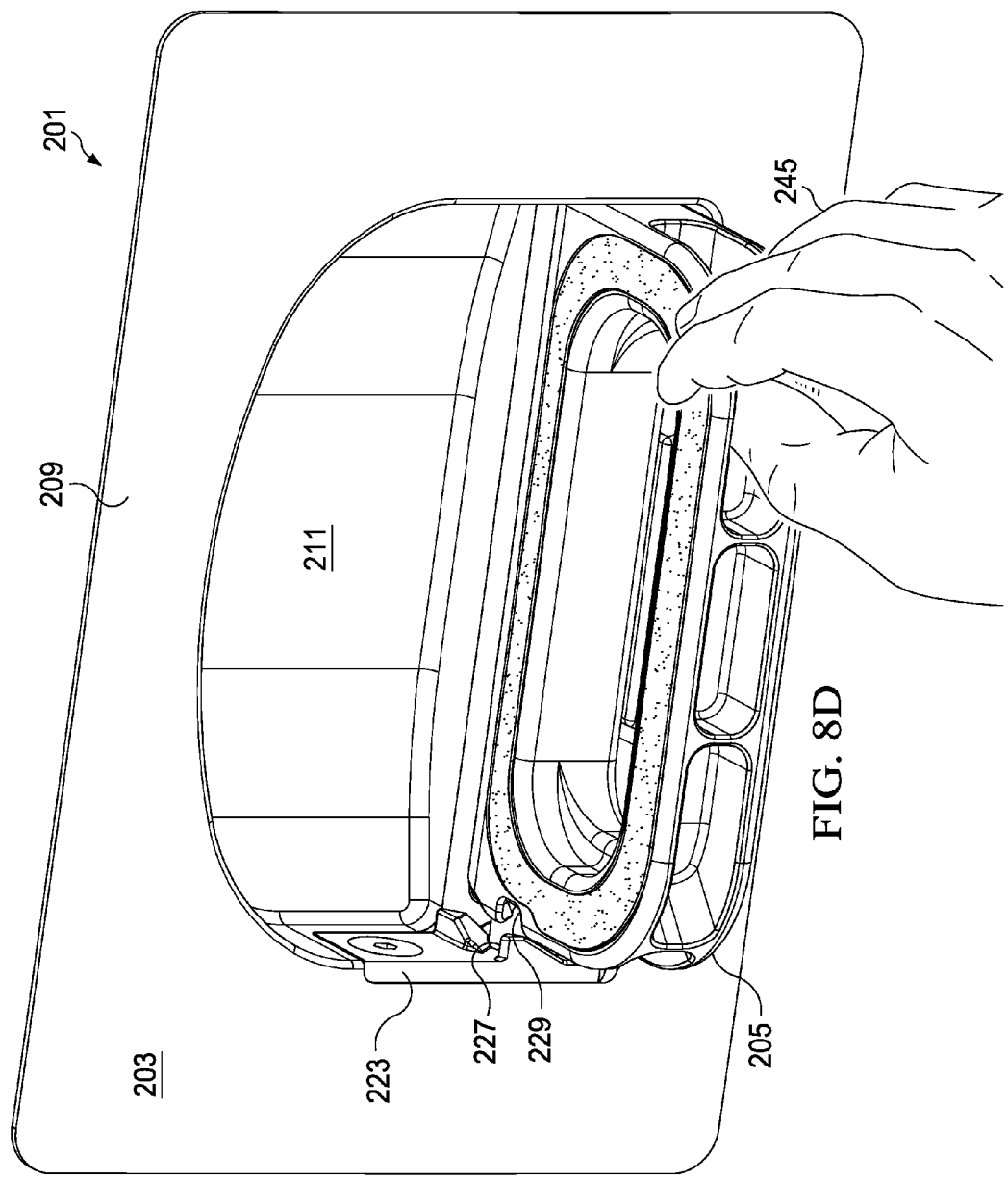

EXTERNAL MAINTENANCE STEP AND HAND HOLD

BACKGROUND

1. Technical Field

The present disclosure relates to a maintenance step and hand hold for a vehicle. More specifically, the present disclosure relates to a maintenance step and hand hold for an aircraft.

2. Description of Related Art

It can be desirable to provide an apparatus for aircraft operators, such as maintainers, to efficiently access the upper portions of the aircraft. Conventionally, an aircraft can have a hole in the fuselage of the aircraft that is configured as a foot space to allow an operator to step up and access upper portions of the aircraft. However, in order to accommodate large boots, the hole also must be large, which can negatively influence aerodynamic drag and aesthetic appeal. Further, conventional external maintenance fixtures require time and effort to position near the aircraft.

There is a need for an improved apparatus that allows an operator of an aircraft to gain access and service upper portions of an aircraft.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

FIGS. 8A-8E are progressive views of the step assembly being translated from a stowed position to a deployed position, according to an illustrative embodiment of the present disclosure.

DESCRIPTION OF THE PREFERRED EMBODIMENT

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
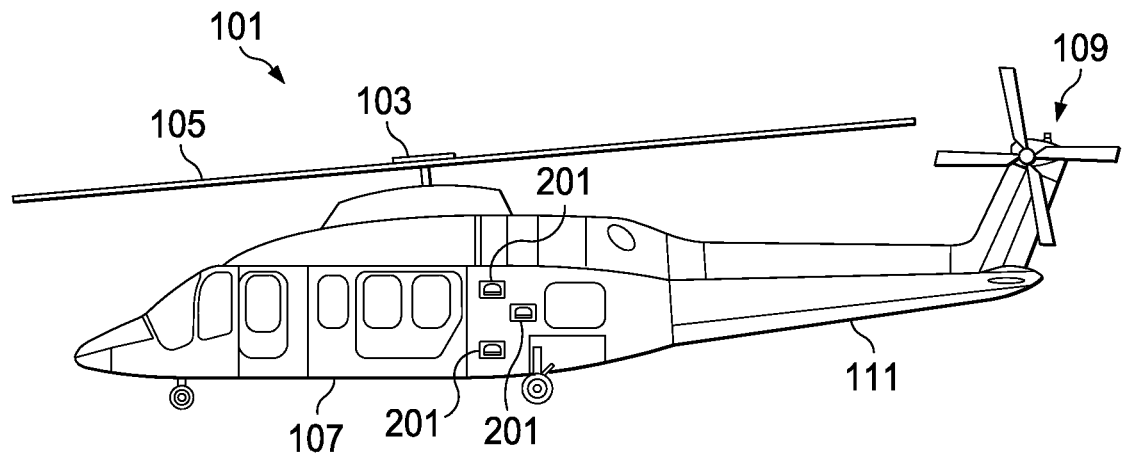
FIG. 1 is an exterior side view of a rotorcraft having a step assembly, according to an illustrative embodiment of the present disclosure.
Figure 2:
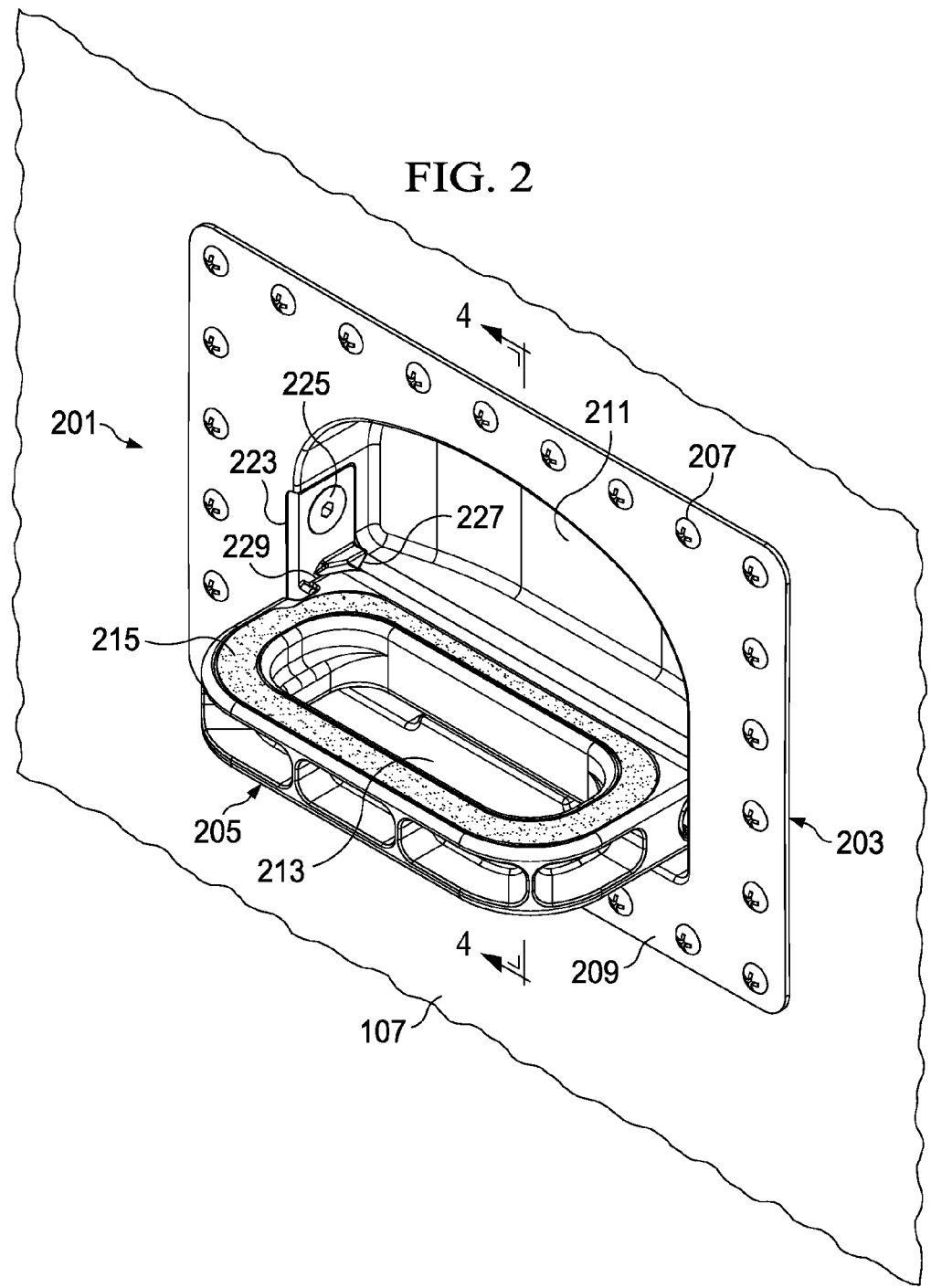
FIG. 2 is a perspective view of the step assembly in a deployed position, according to an illustrative embodiment of the present disclosure.
Figure 3:
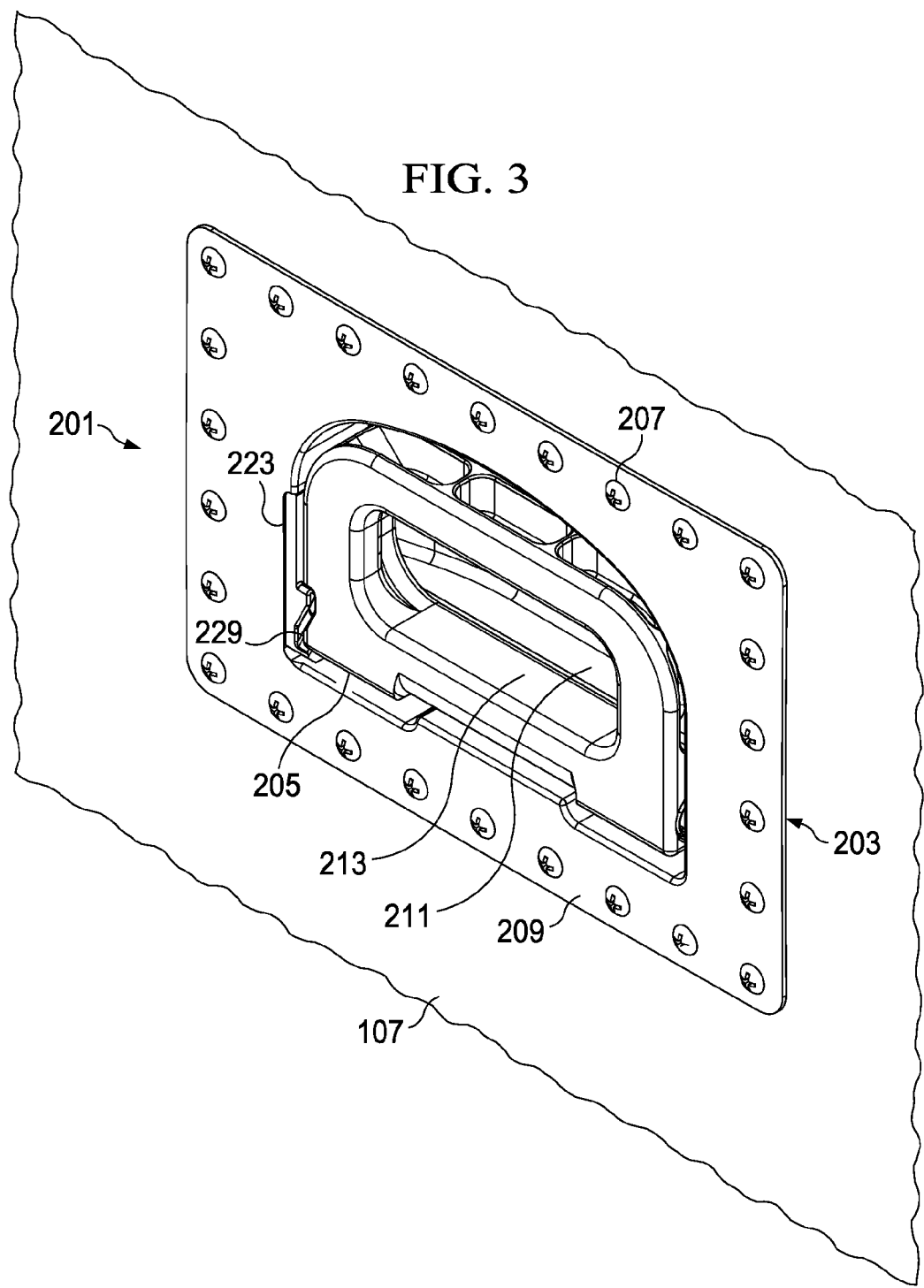
FIG. 3 is a perspective view of the step assembly in a stowed position, according to an illustrative embodiment of the present disclosure.
Figure 4:
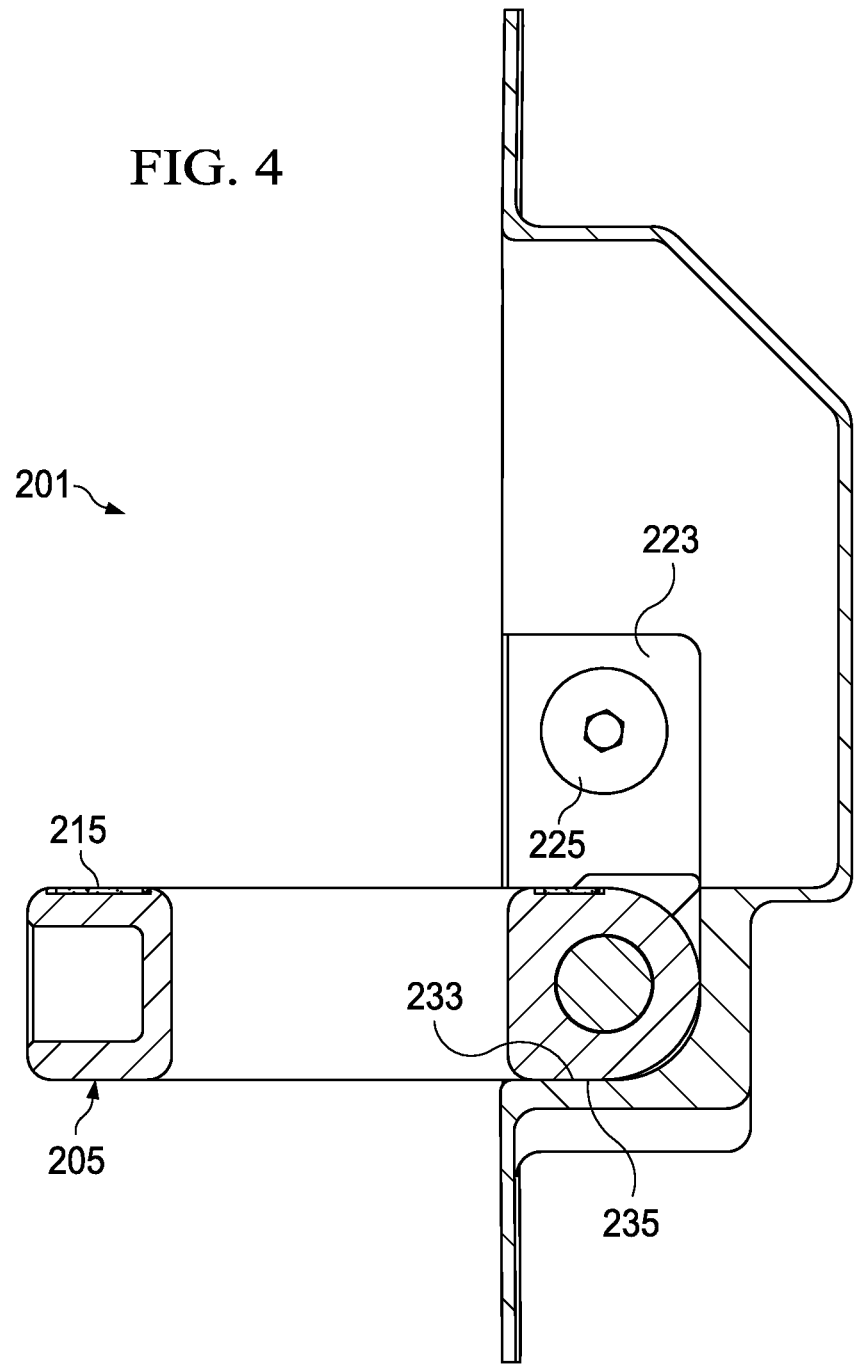
FIG. 4 is a cross-sectional view of the step assembly taken from section lines 4-4 in FIG. 2, according to an illustrative embodiment of the present disclosure.
Figure 5:
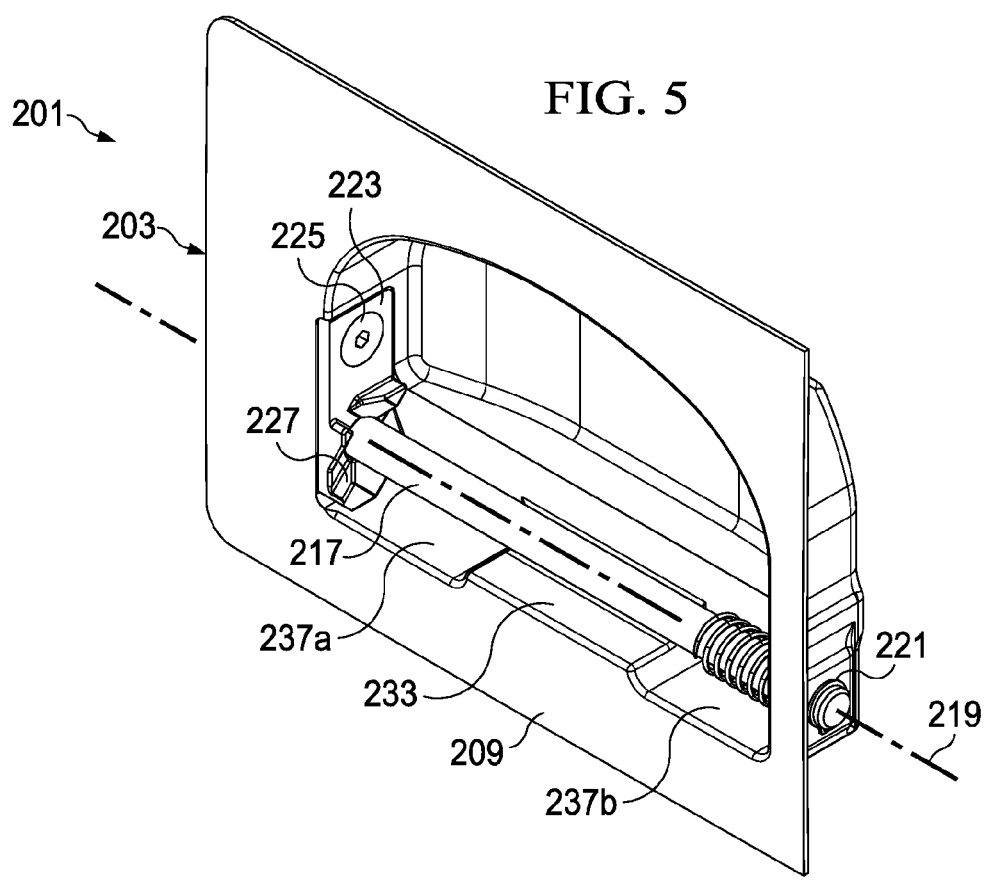
FIG. 5 is a perspective view of the step assembly with the support member removed for clarity, according to an illustrative embodiment of the present disclosure.

Referring now to FIG. 1 in the drawings, a rotorcraft 101 is illustrated. Rotorcraft 101 has a rotor system 103 with a plurality of rotor blades 105. The pitch of each rotor blade 105 can be managed in order to selectively control direction, thrust, and lift of rotorcraft 101. Rotorcraft 101 can further include a fuselage 107, anti-torque system 109, and an empennage 111. Torque is supplied to rotor system 103 and anti-torque system 109 with at least one engine. Rotorcraft 101 can include one or more step assemblies 201 located to provide a climbing path up fuselage 107. Each step assembly 201 is a multi-purpose retractable maintenance step and hand hold to enable increased safety for operator during service of the upper deck of rotorcraft 101. Step assembly 201 can be substantially flush to the external surface of fuselage 107 when in the retracted position, thereby providing aerodynamic advantage over conventional systems. Step assembly 201 can include safety features, ergonomic provisions, rapid single hand retraction/deployment, locking features, anti-slip surface, geometry suitable for both foot and hand support, illumination upon deployment, heating, and safety rope attachment. These and other features are discussed further herein.

Rotorcraft 101 is merely illustrative of the wide variety of aircraft and vehicles that are particularly well suited to take advantage of the apparatus of the present disclosure. Illustrative aircraft can include: hybrid aircraft, tilt rotor aircraft, fixed wing aircraft, and unmanned aircraft, to name a few. Illustrative vehicles can include land based vehicles, such as automobiles and tactical vehicles. Further, illustrative vehicles can include sea-based vehicles, such as ships. It should be appreciated that structures other than aircraft and vehicles may also implement the apparatus of the present disclosure.

Referring now also to FIGS. 2-7, step assembly 201 can include a housing 203 and a support member 205. In the illustrated embodiment, housing 203 is a unitary member that is attached to fuselage 107 by any suitable means, such as with mechanical fasteners or bonding. For example, fasteners 207 can be used to attach housing 203 to fuselage 107. However, in an alternative embodiment, housing 203 is integrated into the structure of fuselage 107 such that housing 203 is not a stand alone part. Housing 203 can include a flange 209 that is adjacent to a surface of fuselage 107. Housing 203 can further include a recessed portion 211 having a depth for accommodating support member 205 while in the stowed position.

Support member 205 is a retractable structure configured not only as a foot support, but also as a hand hold. Further, support member 205 is configured to receive a safety rope by attachment thereto. Support member 205 includes an opening 213 sized so that a person's hand can grab support member 205. Opening 213 defines an interior shape of support member 205. In the illustrated embodiment, support member 205 is an oblong loop shape; however, it should be appreciated that support member 205 can be any variety of shapes that may satisfy the ergonomic requirements. Further, it should be appreciated that opening 213 is a preferred feature and not required; however, the absence of any sort of opening may limit functionality of support member 205 in terms of providing an attachment point for a safety harness.

A foot supporting surface of support member 205 can have anti-skid tape 215 bonded thereto. In an alternative embodiment, the foot supporting surface can have knurled features, or another anti-slip feature formed thereon to provide anti-slip properties. For example, raised features on the foot supporting surface can be utilized to provide anti-slip properties. Support member 205 is hingedly coupled to housing 203 with a shaft 217, thus an axis 219 of shaft 217 is also the rotational axis of support member 205. A clip member, such as clip member 221 can be utilized to prevent shaft 217 from migrating out of the apertures in housing 203.

A plate 223 is secured to an interior portion of housing 203 with a fastener 225. Plate 223 includes a locking feature 227 that interacts with a mating locking feature 229 on support member 205. In an alternative embodiment, the features of plate 223 are integral with housing 203; however, the removability of plate 223 can be advantageous for servicing and/or replacing of plate 223. A spring 231 is located around shaft on the opposite end from plate 223. Spring 231 is in compression between housing 203 and support member 205 such that spring 231 applies a spring biasing force pushing support member 205 toward plate 223. In the illustrated embodiment, plate 223 is secured to a forward interior portion of housing 203 while spring 231 is located against an aft interior portion of housing 203; however, it should be appreciated that in an alternative embodiment plate 223 can be secured to an after portion of housing while spring 231 is located against a forward interior portion of housing 203.

Housing 203 includes a bearing surface 233 that contacts a bearing surface 235 of support member 205 so that operational loads are transferred from support member 205 to housing 203 between structural contact between bearing surfaces 233 and 235, rather than through support member 205 to plate 223. The locking feature 227 of plate 223 is intended to provide a locking mechanism to prevent support member 205 from unintentional rotating out of the stowed and deployed positions. Bearing surface 233 of housing 203 is raised upward toward the center such that loads are distributed toward the center of housing 203. Further, bearing surface 233 of housing is raised above gutters 237a and 237b which are sloped to expel water and resist the accumulation of debris or other contaminates in housing 203.

Figure 6:
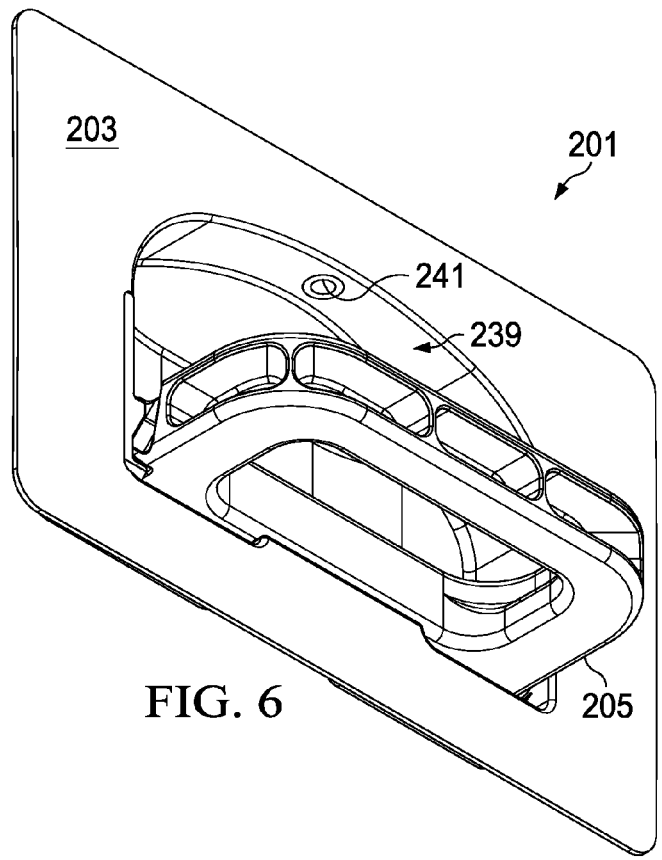
FIG. 6 is a perspective view of the step assembly in a deployed position, according to an illustrative embodiment of the present disclosure.
Figure 7:
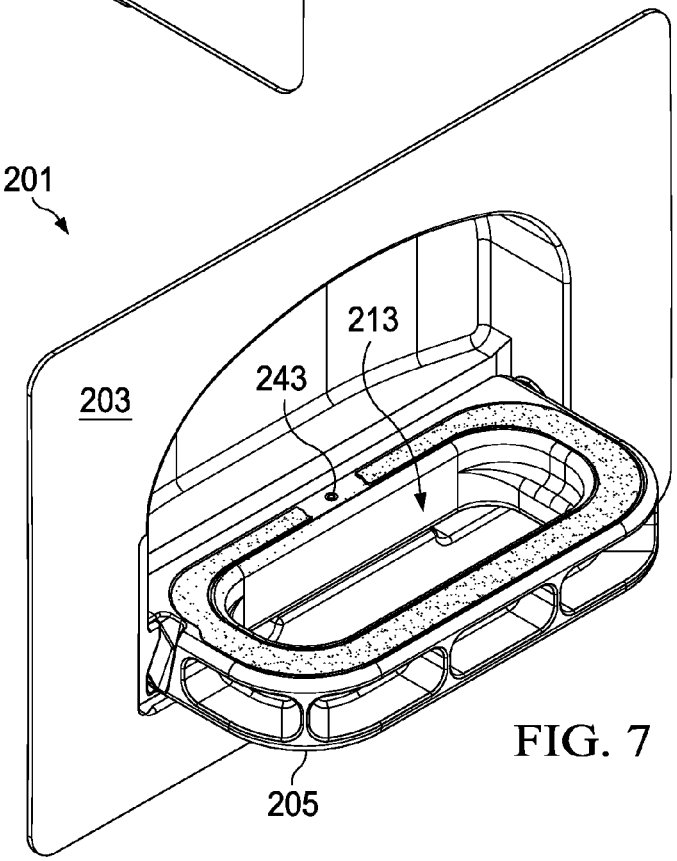
FIG. 7 is a perspective view of the step assembly in a deployed position, according to an illustrative embodiment of the present disclosure.

Referring in particular to FIGS. 6 and 7, an optional illumination system 239 is illustrated. Illumination system 239 can include a light source 241 that is selectively activated by a switch 243. Light source 241 is position to shine down upon support member to improve safety, especially when step assembly 201 is being utilized in a low light environment. In the illustrated embodiment, switch 243 includes a magnetic sensor that activates light source 241 when switch 243 is rotated away from the recessed portion 211 of housing 203. In the illustrated embodiment, light source 241 is powered by the aircraft power system; however, alternative embodiments can include alternative sources of power, such as a battery for example.

Figure 8A:
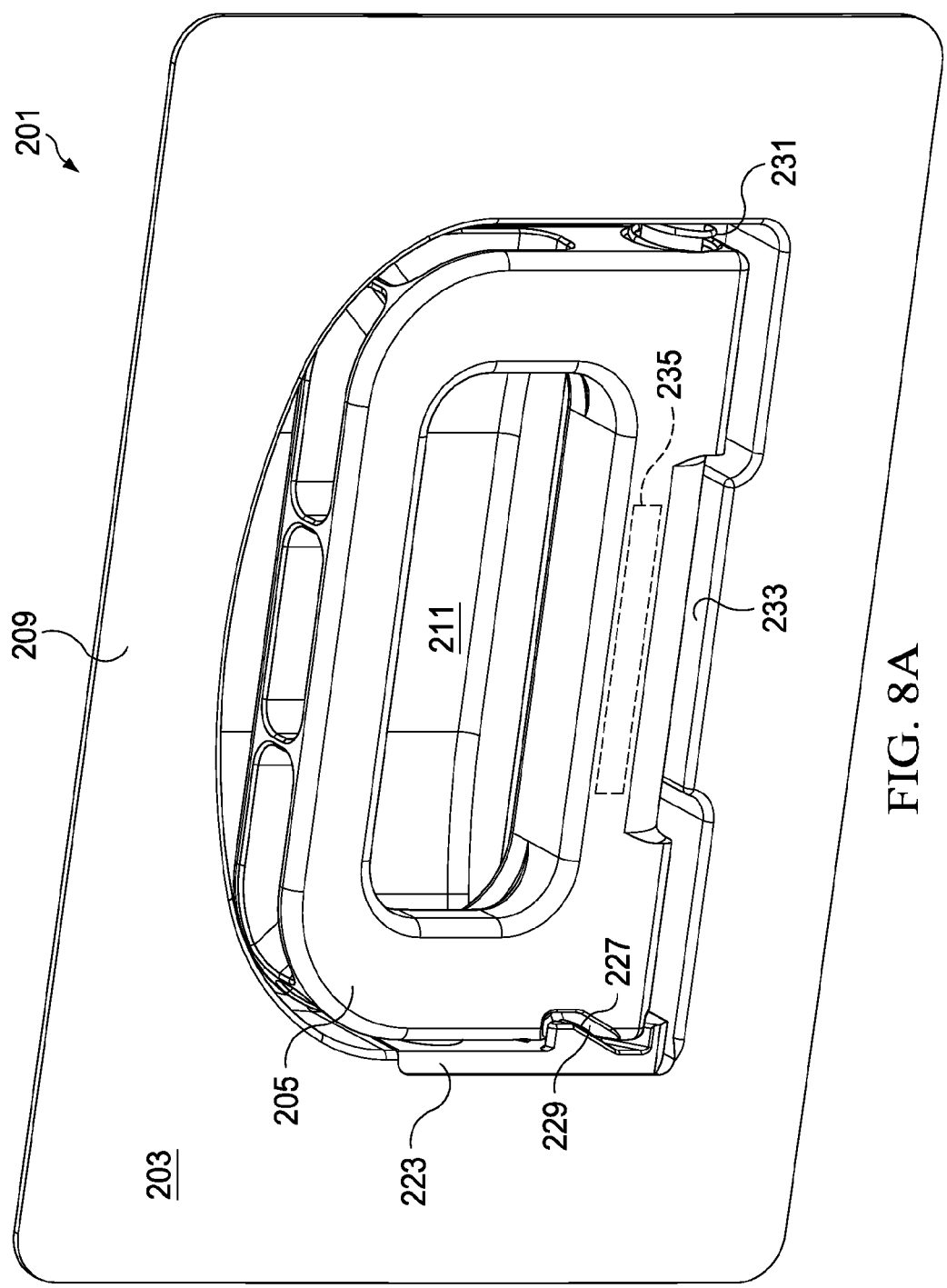

Referring now also to FIGS. 8A-8E, the operation of the step assembly 201 is illustrated in further detail. FIG. 8A illustrates step assembly 201 in the stowed position. In the stowed position, the outboard surface of support member 205 is approximately flush with the outboard surface of the flange 209 of housing 203. In the stowed position, locking feature 227 of plate 223 is engaged with the mating locking feature 229 of support member 205. Spring 231 applies a biasing force against support member to keep support member 205 from unintentionally translating along axis 219 of shaft 217.

Referring now in particular to FIG. 8B, a hand 245 of a user is illustrated as the mechanism for deploying support member 205. Hand 245 can engage an interior surface of opening 213 of support member 205 and translate support member 205 along the axis 219 of shaft 217 (shown in FIG. 5) in direction 247 with sufficient force to overcome the spring biasing force of spring 231. The aforementioned translation of support member 205 results in a clearance gap between locking feature 227 of plate 223 and mating locking feature 229 of support member 205.

Referring now in particular to FIG. 8C, support member 205 is partially rotated about axis 219 of shaft 217 (shown in FIG. 5) by hand 245. Locking feature 227 of plate 223 and mating locking feature 229 of support member 205 can be configured such that they won't lockingly engage each other unless support member 205 is fully in the stowed position or in the deployed position, which can prevent any danger associated with locking support member 205 in a partially deployed position.

Referring now in particular to FIG. 8D, support member 205 is fully rotated about axis 219 of shaft 217 (shown in FIG. 5) by hand 245. At this point, bearing surface 233 of housing 203 is adjacent to bearing surface 235 of support member 205.

Figure 8E:
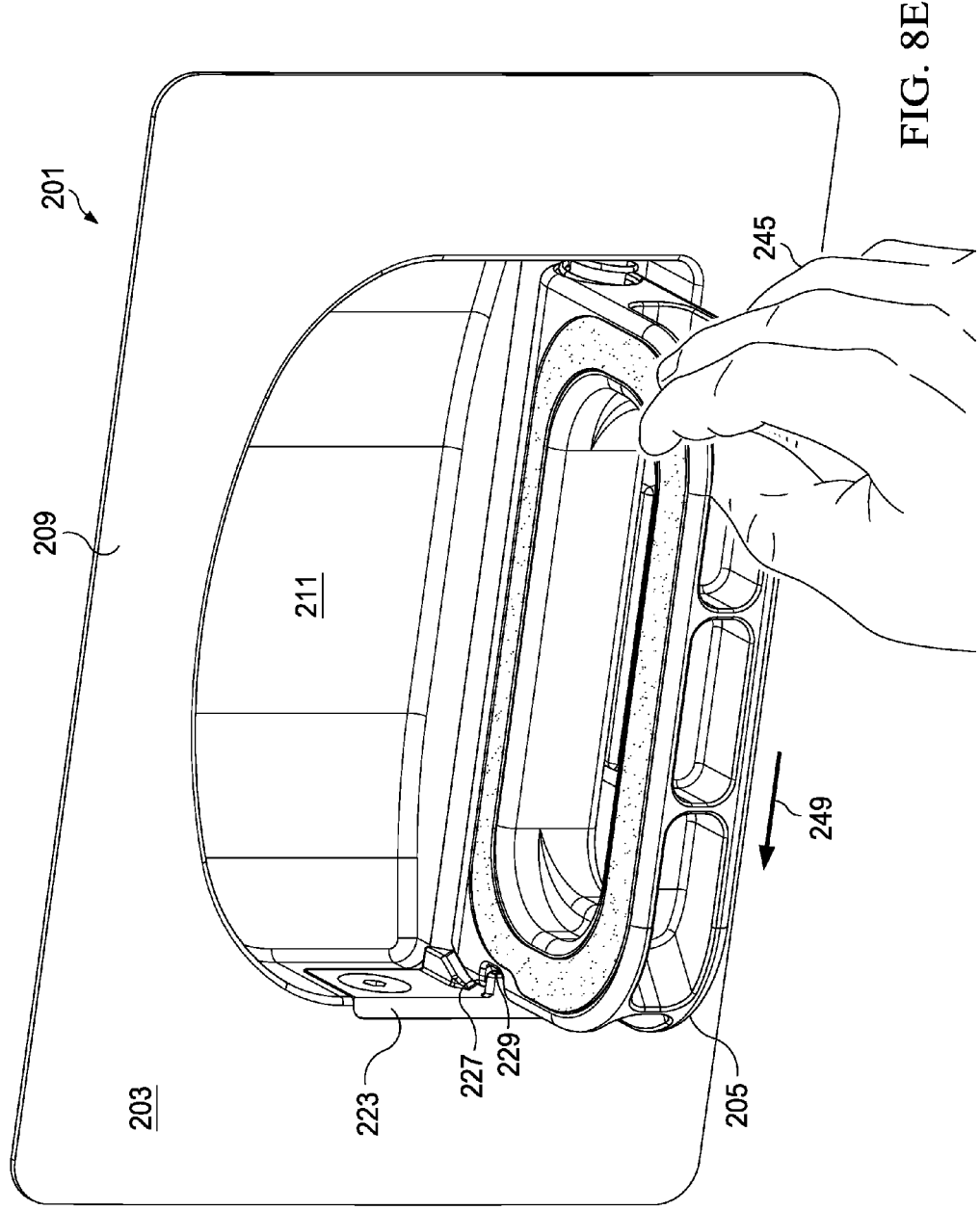

Referring now in particular to FIG. 8E, once support member 205 is fully rotated to the deployed rotational angle, the user's hand 245 can release support member 205 such that spring 231 pushes support member 205 in direction 249 so that locking feature 227 of plate 223 and mating locking feature 229 of support member 205 engage each other, thereby preventing an undesired rotation of support member 205 from the deployed position to the stowed position.

The return of support member 205 from the deployed position to the stowed position is the opposite of that described herein with regard to translated support member 205 from the stowed position to the deployed position. It should be noted that by configuring support member 205 to be released from the locked position by a user's hand 245 engaging support member 205 from with opening 213 reduces the possibility of trapping the user's hand or fingers between support member 205 and housing 203.

In the illustrated embodiment, locking feature 227 of plate 223 and mating locking feature 229 of support member 205, are oriented to provide a mechanical lock in the stowed position as well as in the deployed position. In the illustrated embodiment, the angular difference between the stowed position and the deployed position is approximately 90 degrees. However, it should be appreciated that the exact rotational difference between the stowed position and the deployed position is implementation specific. In the illustrated embodiment, locking feature 227 includes raised features and indentions that matingly lock with raised features and indentations of mating locking feature 229 of support member 205 when aligned at the stowed position and the deployed position. Further, the exact geometry of locking feature 227 and mating locking feature 229 are implementation specific.

In one embodiment, step assembly 201 includes a heating element that can be selectively activated in order to prevent ice accumulation and/or melt accumulated ice, thereby increasing the safety to an operator.

Step assembly 201 can provide substantially improved safety levels for operators of rotorcraft 101, as compared to conventional systems. Further, the functionality of support member as a foot step, hand hold, and safety harness attachment member, provides increased effectiveness compared to conventional systems. Step assembly 201 can be rapidly deployed and safely locked in the stowed or deployed position in a short amount of time. Further, step assembly 201 can't be accidently retracted from the deployed position while in use. The provision of illumination system 239 can provide an added safety feature by providing an illuminated safe path when an operator is moving up or down the rotorcraft in a low light environment. Step assembly 201 can be sized to accommodate any ergonomic requirements and allow substantial load levels beyond normal operator usage.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A step assembly for a vehicle, the step assembly comprising:
   a housing having a recessed portion;
   a support member hingedly coupled to the housing with a shaft;
   a first locking feature associated with the housing;
   a second locking feature associated with the support member; and
   a spring operably associated with the support member and the housing such that the spring biases the second locking feature toward the first locking feature.

2. The step assembly according to claim 1, wherein the support member includes an aperture located therethrough.

3. The step assembly according to claim 1, wherein the support member is translatable along an axis of the shaft.

4. The step assembly according to claim 1, further comprising:
   a plate integral with the first locking feature.

5. The step assembly according to claim 4, wherein the plate is coupled to an interior portion of the housing.

6. The step assembly according to claim 1, further comprising:
   an anti-skid member on a step surface of the support member.

7. The step assembly according to claim 1, wherein the vehicle is a rotorcraft.

8. The step assembly according to claim 1, wherein the support member is configured to rotated between a stowed position and a deployed position.

9. The step assembly according to claim 8, wherein the support member is configured to be mechanically locked in the stowed position by the second locking feature and the first locking feature.

10. The step assembly according to claim 9, wherein the support member is configured to be mechanically unlocked from the stowed position by a user translating the support member so as to compress the spring.

11. The step assembly according to claim 8, wherein the support member is configured to be mechanically locked in the deployed position by the second locking feature and the first locking feature.

12. The step assembly according to claim 11, wherein the support member is configured to be mechanically unlocked from the deployed position by a user translating the support member so as to compress the spring.

13. The step assembly according to claim 8, wherein the support member includes a first bearing surface that is in contact with a second bearing surface of the housing when the support member is in the deployed position.

14. An aircraft comprising:
    a first step assembly comprising:
        a housing having a recessed portion into an exterior surface of the aircraft;
        a support member hingedly coupled to the housing with a shaft;
        a first locking feature associated with the housing;
        a second locking feature associated with the support member;
        a biasing member operably associated with the support member and the housing such that the biasing member provides a force urging the second locking feature toward the first locking feature.

15. The aircraft according to claim 14, further comprising:
    an additional step assembly located vertically higher than the first step assembly so as to create a climbing pattern along a fuselage of the aircraft.

16. The aircraft according to claim 14, wherein the first step assembly is operable between a stowed position and a deployed position, the deployed position configured such that the support member is approximately perpendicular to the housing.

17. The aircraft according to claim 14, wherein the support member is configured as a step support and a hand hold device.

18. The aircraft according to claim 14, wherein the first step assembly is operable between a stowed position and a deployed position, the stowed position configured such that an outboard surface of the support member is approximately flush to an outer surface of a fuselage of the aircraft.

* * * * *